(12) United States Patent
Fukuzawa et al.

(10) Patent No.: US 8,357,463 B2
(45) Date of Patent: Jan. 22, 2013

(54) POLYMER BATTERY AND RELATED METHOD

(75) Inventors: Tatsuhiro Fukuzawa, Yokohama (JP); Kouichi Nemoto, Zushi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 602 days.

(21) Appl. No.: 11/984,724

(22) Filed: Nov. 21, 2007

(65) Prior Publication Data

US 2008/0268337 A1    Oct. 30, 2008

Related U.S. Application Data

(62) Division of application No. 10/658,456, filed on Sep. 10, 2003, now Pat. No. 7,318,979.

(30) Foreign Application Priority Data

Oct. 30, 2002 (JP) ................ P 2002-316039

(51) Int. Cl.
H01M 2/18 (2006.01)
(52) U.S. Cl. .......... 429/130; 429/129; 429/143; 429/145
(58) Field of Classification Search .............. None
See application file for complete search history.

(56) References Cited

U.S. PATENT DOCUMENTS

| | | | |
|---|---|---|---|
| 1,484,927 A * | 2/1924 | Benner et al. | 429/249 |
| 4,618,545 A * | 10/1986 | Clegg et al. | 429/130 |
| 5,521,023 A | 5/1996 | Kejha et al. | |
| 5,631,103 A | 5/1997 | Eschbach et al. | |
| 6,413,676 B1 | 7/2002 | Munshi | |
| 6,451,485 B1 | 9/2002 | James et al. | |
| 6,580,026 B1 | 6/2003 | Koyanagi et al. | |
| 2001/0019798 A1 | 9/2001 | Kajiura et al. | |
| 2002/0031710 A1 * | 3/2002 | Kezuka et al. | 429/303 |

FOREIGN PATENT DOCUMENTS

| | | |
|---|---|---|
| EP | 0 938 150 A2 | 8/1999 |
| JP | 09-237639 | 9/1997 |
| JP | 10-144349 | 5/1998 |
| JP | 11-307124 | 11/1999 |
| JP | 11-345629 | 12/1999 |
| JP | 2001-118601 | 4/2001 |
| JP | 2001-357882 | 12/2001 |
| JP | 2002-015772 | 1/2002 |
| JP | 2002-184466 | 6/2002 |
| JP | 2002-216846 | 8/2002 |
| WO | WO 01/91220 A1 | 11/2001 |
| WO | WO 02/061874 A1 | 8/2002 |

OTHER PUBLICATIONS

Office Action dated Jul. 11, 2006.

* cited by examiner

*Primary Examiner* — Cynthia Lee
(74) *Attorney, Agent, or Firm* — McDermott Will & Emery LLP

(57) ABSTRACT

A polymer battery is provided with a positive electrode active material layer, a negative electrode active material layer placed in opposition to the positive electrode active material layer, a polymer electrolyte layer disposed between the positive electrode active material layer and the negative electrode active material layer, and a distance defining member included in the polymer electrolyte layer to define a distance between the positive electrode active material layer and the negative electrode active material layer.

6 Claims, 5 Drawing Sheets

POLYMER BATTERY AND RELATED METHOD

RELATED APPLICATIONS

This application is a Divisional of U.S. application Ser. No. 10/658,456, filed Sep. 10, 2003, claiming priority of Japanese Application No. 2002-316039, filed Oct. 20, 2002, the entire contents of each of which are hereby incorporated by reference.

BACKGROUND OF THE INVENTION

The present invention relates to a polymer battery and its related method and, more particularly, to a polymer battery, which is provided with a positive electrode active material layer and a negative electrode active material layer with a polymer electrolyte layer intervening between such active material layers, and its related method.

In general, in a battery which is constructed of a positive electrode active material layer and a negative electrode active material layer with a polymer electrolyte layer intervening between such active material layers, it is considered that in order to have an increased power output, the electrolyte layer needs to have a thin thickness as thinner as possible to shorten a distance through which ion transfers for thereby decreasing internal resistance of the electrolyte layer. Particularly, in case of a polymer battery using polymer electrolyte as electrolyte, since electrolyte takes the form of semi-solid or solid configuration with low ion conductivity, it is considered that the electrolyte layer needs to be formed in a further thin film configuration.

Japanese Patent Application Laid-Open Publication No. H10-144349 proposes a structure in which polymer electrolyte includes inorganic solid electrolyte so as to improve a mechanical strength of a polymer electrolyte layer.

SUMMARY OF THE INVENTION

However, according to studies conducted by the present inventors, consideration should be undertaken for a tendency wherein the thinner the thickness of the electrolyte layer, the lower will be the mechanical strength with a resultant difficulty in stably forming the polymer electrolyte layer during fabrication of the battery, and such case is deemed to bring about a situation such as contact between the positive electrode active material layer and the negative electrode active material layer.

Here, as disclosed in Japanese Patent Application Laid-Open Publication No. H10-144349, the structure in which the polymer electrolyte layer includes inorganic solid electrolyte to improve the mechanical strength of the polymer solid electrolyte layer has a limited ability to improve the mechanical strength of the polymer solid electrolyte layer and, so, it is considered that when applying the battery incorporating such polymer electrolyte into a device, such as a vehicle, which suffers from vibrations, the room is still left for improvement.

The present invention has been completed through the studies conducted by the present inventors set forth above and has an object to provide a polymer battery and its related method wherein a thickness of a polymer electrolyte layer is thinned while providing an increased mechanical strength.

To achieve the above object, in one aspect of the present invention, a polymer battery comprises: a positive electrode active material layer; a negative electrode active material layer placed in opposition to the positive electrode active material layer; a polymer electrolyte layer disposed between the positive electrode active material layer and the negative electrode active material layer; and a distance defining member included in the polymer electrolyte layer to define a distance between the positive electrode active material layer and the negative electrode active material layer.

In other words, in another aspect of the present invention, a polymer battery comprises: a positive electrode active material layer; a negative electrode active material layer placed in opposition to the positive electrode active material layer; a polymer electrolyte layer disposed between the positive electrode active material layer and the negative electrode active material layer; and defining means, included in the polymer electrolyte layer, for defining a distance between the positive electrode active material layer and the negative electrode active material layer.

Besides, in another aspect of the present invention, there is provided a method of manufacturing a polymer battery, the method comprising: forming a polymer electrolyte layer, including a distance defining member, onto one of a positive electrode active material layer and a negative electrode active material layer; and forming the other one of the positive electrode active material layer and the negative electrode active material layer onto the polymer electrolyte layer such that a distance between the positive electrode active material layer and the negative electrode active material layer is defined by the distance defining member.

Other and further features, advantages, and benefits of the present invention will become more apparent from the following description taken in conjunction with the following drawings.

DETAILED DESCRIPTION OF THE PREFERRED EMBODIMENTS

Hereinafter, a polymer battery of each embodiment according to the present invention and related method are described in detail with suitable reference to the attached drawings. Also, in the attached drawings described below, various component elements are expressed in exaggeration for the sake of clarifying description.

First Embodiment

First, a polymer battery of a first embodiment according to the present invention and its related method are described in detail with reference to FIGS. 1 to 4B.

The polymer battery of this embodiment is comprised of a positive electrode active material layer and a negative electrode active material layer with a polymer electrolyte layer intervening between the positive electrode active material layer and the negative electrode active material layer and, particularly, has a structure wherein the polymer electrolyte layer includes distance defining members that define a distance between the positive electrode active material layer and the negative electrode active material layer. Also, the presently filed embodiment is described below in conjunction with an exemplary case wherein the polymer battery takes the form of a bipolar lithium ion secondary battery (hereinafter merely termed a bipolar battery).

Initially, a bipolar electrode of the bipolar battery of the presently filed embodiment is described.

Figure 1:
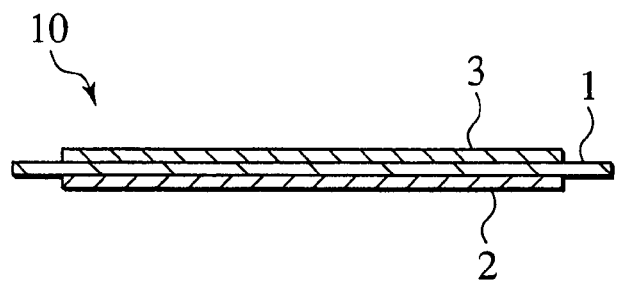
FIG. 1 is a cross sectional view illustrating an electrode of a polymer battery of a first embodiment according to the present invention.
Figure 2:
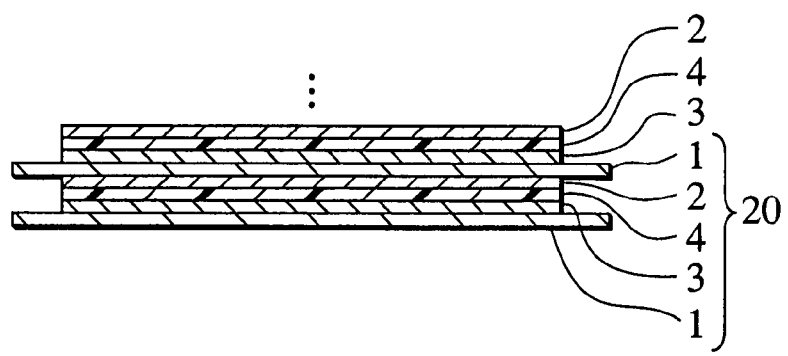
FIG. 2 is a cross sectional view illustrating a structure in which the electrodes are stacked with electrolyte layers being sandwiched in the first embodiment.

FIG. 1 is a cross sectional view illustrating the bipolar electrode of the bipolar battery of the presently filed embodiment, and FIG. 2 is a cross sectional view illustrating a structure in which the bipolar electrodes are stacked with electrolyte layers being interposed.

As shown in FIG. 1, the bipolar electrode 10 of a sheet shape forming the bipolar battery has a structure wherein a current collector 1 has one surface on which the positive electrode active material layer 2 is disposed and the other surface on which the negative electrode active material layer 3 is disposed, with these component elements being laminated in a unitary configuration. In other words, the bipolar electrode 10 has a structure in which the positive electrode active material layer 2, the current collector 1 and the negative electrode active material layer 3 are laminated in this order and constitutes a fundamental battery element that forms the bipolar battery.

The bipolar electrodes 10 with such structures are disposed, such that all the orders to be stacked are identical as shown in FIG. 2, and are sequentially stacked with the polymer electrolyte layers 4 being interposed to form the bipolar battery.

Here, the reason why the polymer electrolyte layer 4 is interposed between the positive electrode active material layer 2 and the negative electrode active material layer 3 resides in that smooth ion transfer is achieved with an improved power output of the bipolar battery as a whole. Further, since the polymer electrolyte layer 4 is a solid layer, no liquid leakage of electrolyte takes place and no structure to prevent electrolyte from dissolving is required, enabling the bipolar battery to be simplified in structure.

Also, a stacked body, composed of a pair of current collectors 1, 1, and the negative electrode active material layer 3, the electrolyte layer 4 and the positive electrode active material layer 2, which are interposed between the current collectors 1, 1 in a laminated configuration, is termed as a unit cell layer 20. Each current collector 1 of the unit cell layer 20 is functionally shared in common with the current collector 1 of an adjacent unit cell layer 20.

Next, description is made of an overall structure of the bipolar battery of the presently filed embodiment. With the bipolar battery, the polymer electrolyte layer 4 is arranged to incorporate the distance defining members whose detail are described below.

Figure 3:
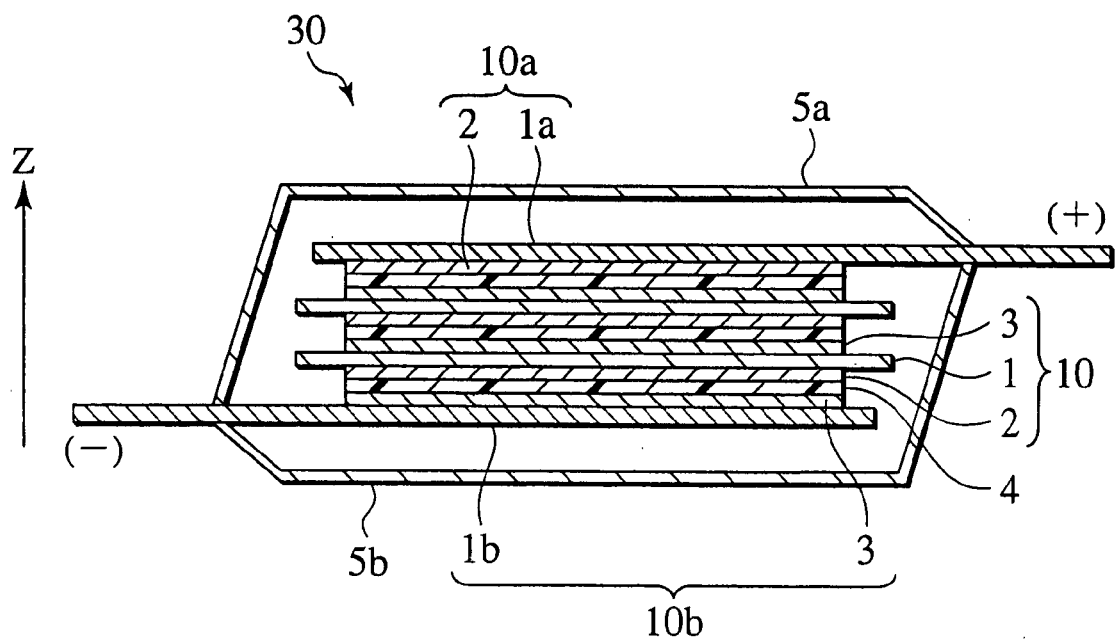
FIG. 3 is a cross sectional view illustrating a structure of the polymer battery of the first embodiment.

FIG. 3 is a cross sectional view illustrating a structure of the bipolar battery of the presently filed embodiment. Also, in the figure, the number of pieces of the bipolar electrodes 10 is merely illustratively indicated and is not intended to be limited.

As shown in FIG. 3, the bipolar electrodes 10 and the electrolyte layers 4 are alternately and sequentially stacked in a stack direction Z, thereby forming a bipolar battery 30 into a stacked body. Here, the outermost bipolar electrodes 10, 10 need to have a current collector, serving as a terminal that functions as a positive electrode of the bipolar battery 30, and a current collector, serving a terminal that functions as a negative electrode of the bipolar battery 30, and, in the figure, one which forms the terminal serving as the positive electrode is indicated as a current collector 1a while the other one which forms the terminal serving as the negative electrode is indicated as a current collector 1b. Further, an outside surface of the current collector 1a serving as the positive electrode has no need to be formed with the negative electrode active material layer 3 that is consequently dispensed with, and an outside surface of the current collector 1b serving as the negative electrode has no need to be formed with the positive electrode active material layer 2 that is consequently dispensed with. That is, although the positive electrode active material layer 2 and the negative electrode active material layer 3 are shown to be omitted from the outermost electrodes 10a, 10b, if circumstances require, it is not objectionable to take the form of a structure provided with such active material layers but not for use in actual.

More particularly, the bipolar battery 30 are fabricated by, firstly, preparing the electrode 10b, having the current collector 1b serving as the negative electrode, the respective electrolyte layers 4, the respective bipolar electrodes 10 and the electrode 10a having the current collector 1a serving as the positive electrode, then, onto the negative electrode active material layer 3 of the electrode 10b, stacking the electrolyte layer 4, the bipolar electrode 10 with the positive electrode active material layer 2 opposing to the electrolyte layer 4, the electrolyte 4 and the bipolar electrode 10 with the negative electrode active material layer 3 opposing to the electrolyte layer 4 in a sequential order to form a stacked structure, and then, stacking the electrode 10a onto such a stacked structure so as to allow the positive electrode active material layer 2 to be opposed thereto for thereby forming a stack body of the battery element, and finally, hermetically sealing the stacked body with laminate sheets 5a and 5b. Of course, if circumstances demand, it is possible for the respective layers to be laminated on the electrode 10b in a sequential order.

Here, the current collectors 1a and 1b involved in the outermost electrodes 10a, 10b extend to the outside of the bipolar battery 30 to be taken out and serve as a positive terminal and a negative terminal, respectively. In the meantime, the battery element such as the bipolar electrode 10 and the electrolyte layer 4 are hermetically sealed under reduced pressure with the laminate sheets 5a and 5b which are bonded at extended portions of the current collectors 1a and 1b.

The laminate sheets 5a and 5b are made from polymer-metal composite films each of which is formed of a thermally bonding resin film, a metallic foil and a resin film with a rigidity which are laminated in this order, and the thermally bonding resin films of the respective sheets are placed to be opposed to one another and then bonded to one another. Also, due to a probability of short-circuiting to occur in the presence of direct contact between the metallic foils of the laminate sheets 5a, 5b and the current collectors 1a, 1b serving as the terminals, sealing resin may be preferably used for bonding to keep these components in a non-contact capability. As such sealing resin, epoxy resin may be utilized.

Now, a structure of the polymer electrolyte layer of the bipolar battery of the presently filed embodiment is described in more detail.

Figure 4A:
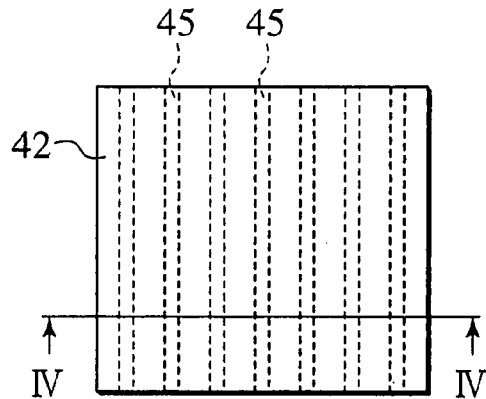
FIG. 4A is a plan view of a polymer electrolyte layer in which distance defining members are included.
Figure 4B:
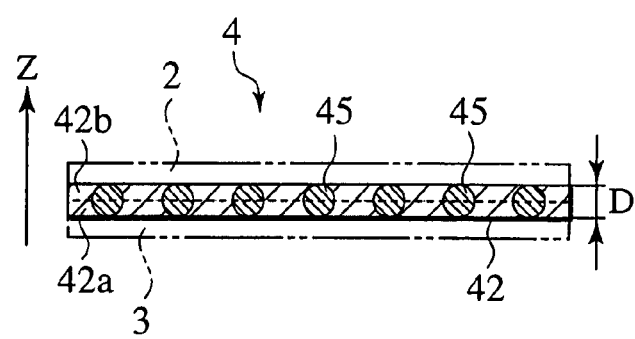
FIG. 4B is a cross sectional view, taken on line IV-IV of FIG. 4A, of the polymer electrolyte layer including the distance defining members.

FIG. 4A is a plan view of the polymer electrolyte layer including the distance defining members for the bipolar battery of the presently filed embodiment, and FIG. 4B is a cross section, taken along line IV-IV of FIG. 4A, of the polymer electrolyte layer including such distance defining members.

As shown in FIGS. 4A and 4B, the polymer electrolyte layer 4 is comprised of a polymer electrolyte 42 in which the distance defining members 45 are embedded. The distance defining members 45 are structured such that a plurality of wire-like members are disposed in parallel to one another in a substantially equally spaced relationship with a given distance. Namely, the polymer electrolyte layer 4 has a structure that includes the distance defining members 45 by which a distance D is defined between the positive electrode active material layer 2, to be laminated above the polymer electrolyte layer 4, and the negative electrode active material layer 3 to be laminated beneath the polymer electrolyte layer 4. Stated another way, it is concluded that the distance defining members 45 define a thickness D along the stack direction Z of the polymer electrolyte layer 4 that is placed between the positive electrode active material layer 2 and the negative electrode active material layer 3.

Figure 4C:
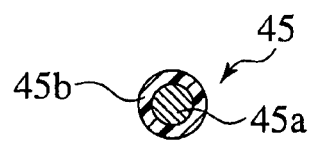
FIG. 4C is a cross sectional view of one example of the distance defining member, respectively in the first embodiment.

Materials to be used for the distance defining members 45 includes resin fibers or metallic thin wires with their surfaces coated with resin. Also, FIG. 4C shows a cross sectional view of one distance defining member 45 formed in an exemplary structure in which a metallic thin wire 45a has a surface coated with a resin layer 45b.

Here, the polymer electrolyte layer 4 is formed of a solid or semi-solid layer that is made from polymer with ion conductivity and no limitation is intended for material of electrolyte per se provided that it provides the ion conductivity. Solid electrolyte includes polymer solid electrolyte such as polyethylene oxide (PEO), polypropylene oxide (PPO) and co-polymer of these materials. Contained in polymer solid electrolyte is supporting salt (lithium salt) for ensuring the ion conductivity. As supporting salt, use may be made of $LiBF_4$, $LiPF_6$, $LiN(SO_2CF_3)_2$, $LiN(SO_2C_2F_5)_2$, $Li(C_2F_5SO_2)_2N$ or a mixture of these compounds. However, supporting salt is not limited to these compounds. Polyalkylene oxide series polymer such as PEO, PPO is able to dissolve lithium salts such as $LiBF_4$, $LiPF_6$, $LiN(SO_2CF_3)_2$, $LiN(SO_2C_2F_5)_2$, $Li(C_2F_5SO_2)_2N$. Also, formation of a bridge structure allows an excellent mechanical strength to be exhibited.

Further, although such polymer solid electrolyte may be included in the polymer solid electrolyte layer, the positive electrode active material layer and the negative electrode active material layer, identical polymer solid electrolyte may be used or different polymer solid electrolyte for each layer may be used.

Furthermore, resin fibers include polypropylene (PP), polyethylene (PE), polyethylene terephthalate (PET), polyamide synthetic fiber (nylon), polyimide and silicone, and same materials may be used for resin to be coated over the metallic thin wire. However, of course, it is to be noted that no limitation is intended for these materials.

Moreover, in view of improvement over the ion conductivity, the polymer electrolyte layer 4 may preferably have a thickness equal to or less than 50 μm.

The polymer solid electrolyte layer 4 with such distance defining members 45 being disposed in such an embedded state is fabricated in a process discussed below.

First, as conceptually shown in FIG. 4B, a plurality of PET fibers 45 with a wire diameter of 20 μm are placed onto a PET film 42a and, then, a mixture of polymer (co-polymer of PEO and PPO), supporting salt ($LiN(SO_2C_2F_5)_2$) and ultraviolet polymerization initiator (benzyldimethyl-ketal) is coated over the resulting PET film. And, further superposed on the PET film thus coated is another PET film 42b, with polymerization being achieved through ultraviolet radiation to form the polymer electrolyte layer 4. In such a way, the polymer electrolyte layer 4 is formed in a structure with the specified portions thereof being formed of the distance defining members 45 but the other major portion thereof being formed of the polymer electrolyte 42 to enable favorable ion transfer. Also, while in FIG. 4B, the PET films 42a, 42b are conceptually shown, in actual practice, a boundary between the PET films 42a, 42b substantially disappears upon formation of the polymer electrolyte layer 4.

In the foregoing, although description has heretofore been made of a principal structure of the bipolar battery equipped with the polymer electrolyte layer 4 having the distance defining members 45 contained in the polymer electrolyte 42 of the presently filed embodiment, further explanation is also hereinafter made of other materials, such as those of the current collector 1, the positive electrode active material layer 2, the negative electrode active material layer 3 and the laminate sheets 5a, 5b. Of course, it is to be noted that such explanation is not intended to be limited.

First, the current collector 1 has surface material formed of aluminum. The presence of surface material made from aluminum provides an active material layer with a high mechanical strength even if resulting active material layer includes polymer solid electrolyte. That is, no limitation is particularly intended for a structure of the current collector 1 provided that surface material includes aluminum. The current collector 1 per se may be formed of aluminum or may take the form of a structure wherein the surface of the current collector 1 is coated with aluminum. That is, the current collector may be of a structure wherein the surface made of other material (such as copper, titanium, nickel, SUS or an alloy of these elements) than aluminum is coated with aluminum. If circumstances demand, the current collector may take the form of a structure in which more than two sheets of plates are laminated. From the viewpoint of corrosion resistance, ease of fabrication and economy, it is preferable for the current collector 1 to be made of an aluminum-foil unit body. Although no particular limitation is intended for a thickness of the current collector 1, normally, the thickness lies in a range of approximately 10 to 100 μm.

Also, the current collectors 1a, 1b serving as the terminals may not differ from the other current collectors 1 and may be formed of materials set forth above.

Next, the positive electrode material layer 2 includes positive electrode active material and may include not only positive electrode active material but also polymer solid electrolyte described above. In addition to these materials, supporting salt (lithium salt) providing increased ion conductivity, conductivity promoting additive agent providing increased electron conductivity, NMP (N-methyl-2-pyrolidone) serving as adjusting solvent for a slurry viscosity and AIBN (azobisisobutyronitrile) serving as polymerization initiator may also be included.

As positive electrode active material, use can be made of composite oxides that include lithium and transition metals and may be used in a lithium ion battery of solvent series. In particular, these include Li.Co series composite compounds such as $LiCoO_2$, Li.Ni series composite compounds such as $LiNiO_2$, Li.Mn series composite compounds such as spinel $LiMn_2O_4$, and Li.Fe series composite compounds such as $LiFeO_2$. In addition to these compounds, use is made of other compounds including phosphate compounds or sulfate compounds between transition metal and lithium such as $LiFePO_4$, transition metal oxide or sulfide such as $V_2O_5$, $MnO_2$, $TiS_2$, $MoS_2$ and $MoO_3$, and other compounds such as $PbO_2$, $AgO$, $NiOOH$. The use of lithium-transition metal composite oxides as positive electrode active material enables a reaction capability and a cycle durability of the polymer battery to be improved, enabling low cost.

For the purpose of reducing electrode resistance of the bipolar battery, positive electrode active material may be used with a grain diameter less than that of positive electrode active material generally used in a lithium ion battery of a solvent type in which electrolyte is no solid electrolyte. In particular, an average grain diameter of positive electrode active material may lie in a range of approximately 0.1 to 5 μm.

Further, as supporting salts, $LiBF_4$, $LiPF_6$, $LiN(SO_2CF_3)_2$, $LiN(SO_2C_2F_5)_2$, $Li(C_2F_5SO_2)_2N$ or a mixture of these compounds may be used.

Moreover, as conductivity promoting additive agent, acetylene black, carbon black and graphite may be used.

Here, the amount of positive electrode active material, polymer solid electrolyte, lithium salt and conductivity promoting additive agent to be blended in the positive electrode active material layer 2 should be determined on consideration of purposes (with a serious view of an output and an energy) of use of the battery and the ion conductivity. In this respect, the smaller the amount of polymer solid electrolyte to be blended in an active material layer, the larger will be ion conductive resistance and ion dispersion resistance in the active material layer, resulting degradation in a battery performance. In contrast, as the amount of polymer solid electrolyte to be blended in the active material layer increases, deterioration in an energy density of the battery results in. As a consequence, upon consideration of these factors, the amount of polymer solid electrolyte is determined so as to satisfy an intended purpose.

More particularly, let's consider a case in which the bipolar battery is manufactured with a priority given to a battery reacting capability through the use of polymer solid electrolyte (with ion conductivity: $10^{-5}$, to $10^{-4}$ S/cm) at a current status level. In order to obtain the bipolar battery with such a characteristic, attempts are undertaken to include an increased amount of conductivity promoting additive agent or to decrease a bulk density of active material to allow electron conductive resistance between active material granules to be kept at a low level. Simultaneously, pore portions are increased to allow these pore portions to be filled with polymer solid electrolyte. Upon conduction of such treatment, the proportion of polymer solid electrolyte may be increased.

Further, no particular limitation is intended to the thickness of the positive electrode material layer 2 and, as set forth above with reference to the amount of materials to be blended, the thickness of the positive electrode material layer 2 should be determined on consideration of purposes (with a serious view of an output and an energy) of use of the battery and the ion conductivity. Preferably, the thickness of the positive electrode material layer 2 lies in a range of approximately 5 to 500 μm.

Next, the negative electrode active material layer 3 includes negative electrode active material and, in addition to this material, may include polymer solid electrolyte. In addition, supporting salt (lithium salt) providing increased ion conductivity, conductivity promoting additive agent providing increased electron conductivity, NMP (N-methyl-2-pyrolidone) serving as adjusting solvent for a slurry viscosity and AIBN (azobisisobutyronitrile) serving as polymerization initiator may also be included. Other substances than these negative electrode active materials are fundamentally similar to positive electrode active material and, hence, description of the same is herein omitted.

As negative electrode active material, it is possible to use negative electrode active material that would be used in the lithium ion battery of solvent series. However, with the bipolar battery of the presently filed embodiment, since polymer solid electrolyte is employed, carbon or composite oxide between lithium and metal may be preferably employed on consideration of the reacting property of polymer solid electrolyte. More preferably, negative electrode active material includes carbon, or composite oxide between lithium and transition metal. More preferably, transition metal includes titanium. In such case, negative electrode active material may preferably include titanium oxide or composite oxide between titanium and lithium. The use of carbon or composite oxide between lithium and transition metal as negative electrode active material enables a reaction capability and a cycle durability of the polymer battery to be improved, enabling low cost.

Finally, the laminate sheets 5a, 5b are used as outer sheath members of the bipolar battery 30 and it may be possible to employ a polymer-metal composite film that is formed of a thermally bonding resin film, a metallic foil and a resin film with a rigidity which are laminated in this order.

As such thermally bonding resin film, polyethylene (PE), ionomer and ethylene-vinyl acetate (EVA) may be used. Also, as a metallic foil, an Al-foil and a Ni-foil may be employed. Moreover, as resin having a rigidity which means that the resin has the rigidity enough to serve as the outer sheath member of the bipolar battery 30, polyethylene terephthalate (PET) and nylon may be used. In particular, use may be made of a PE/Al-foil/PET laminate film, a PE/Al-foil/nylon laminate film, an ionomer/Ni-foil/PET laminate film, an EVA/Al-foil/PET laminate film and an ionomer/Al-foil/PET laminate film, respectively laminated from the sealing surface toward the outer surface of the laminate sheets 5a, 5b.

With the laminate sheets 5a, 5b of such structures, both the thermally bonding resin films are opposed to one another and can be easily and reliably bonded to one another using ultrasonic welding, with the thermally bonding resin films acting as sealing layers when internally encompassing the battery element. The metallic foils and the resin films having the rigidities provide the outer sheath members with a wet resistance property, an anti-air permeability and a chemical resistance property.

Second Embodiment

Figure 5A:
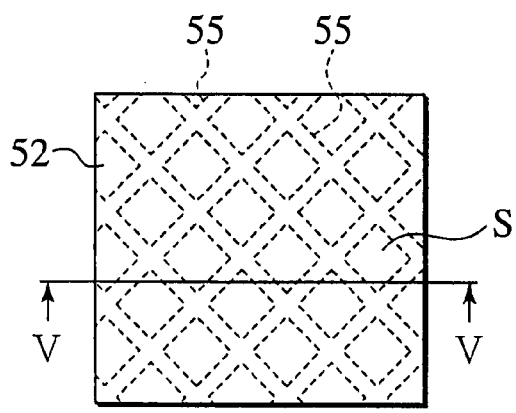
FIG. 5A is a plan view of a polymer electrolyte layer, including distance defining members, of a polymer battery of a second embodiment according to the present invention.
Figure 5B:
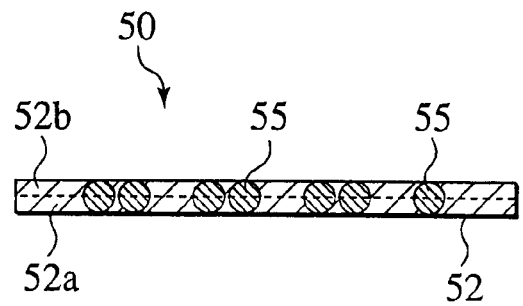
FIG. 5B is a cross sectional view, taken on line V-V of FIG. 5A, of the polymer electrolyte layer including the distance defining members.

Next, a polymer battery of a second embodiment according to the present invention and its related method are described in detail mainly with reference to FIGS. 5A and 5B. The polymer battery, i.e., the bipolar battery, of this embodiment, differ in structure from that of the first embodiment in respect of distance defining members of a polymer electrolyte layer and is similar in other respects. Therefore, this embodiment is described aiming at such differential aspects and like component parts bear the same reference numerals to suitably simplify description or to omit description.

FIG. 5A is a plan view of the polymer electrolyte layer including the distance defining members for the bipolar battery of the second embodiment according to the present invention, and FIG. 5B is a cross section, taken along line V-V of FIG. 5A, of the polymer electrolyte layer including such distance defining members.

As shown in FIGS. 5A and 5B, in the presently filed embodiment, the polymer electrolyte layer 50 is comprised of a polymer electrolyte 52 in which the distance defining members 55 are embedded. The distance defining members 55 are formed in a porous sheet with a plurality of wire-like members, described above with reference to the first embodiment, being disposed not in parallel but in a lattice form.

Materials to be used for the distance defining members 55 are similar to those of the first embodiment and may include resin fibers or metallic thin wires with their surfaces coated with resin.

The polymer electrolyte layer 50, in which the distance defining members 55 are buried, is fabricated in a process described below.

First, as conceptually shown in FIG. 5B, a 200 mesh SUS net 55 (a porous sheet with a cross sectional structure similar to that of FIG. 4C: mesh means number of fibers per inch) whose surface is coated with PP is placed onto a PET film 52a and, then, a mixture of polymer (co-polymer of PEO and PPO), supporting salt ($LiN(SO_2C_2F_5)_2$) and ultraviolet polymerization initiator (benzyldimethyl-ketal) is coated over the resulting PET film. And, further superposed on the PET film thus coated is another PET film 52b, with polymerization being initiated through ultraviolet radiation to form the polymer electrolyte layer 50. In such a way, the polymer electrolyte layer 50 can be formed in a structure with the specified portions thereof being formed of the distance defining members 55 but the other major portion thereof being formed of the polymer electrolyte 52 to enable favorable ion transfer. Also, while in FIG. 5B, the PET films 52a, 52b are conceptually shown, in actual practice, a boundary between the PET films 52a, 52b substantially disappears upon formation of the polymer electrolyte layer 50.

Third Embodiment

Figure 6A:
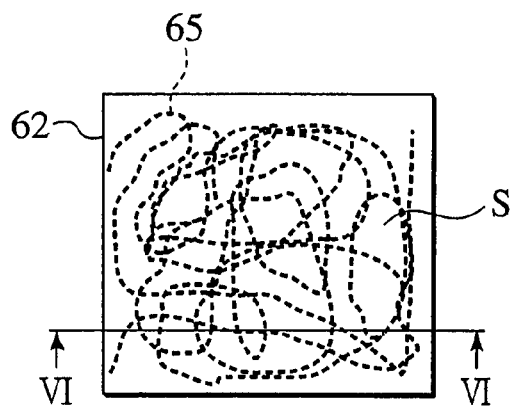
FIG. 6A is a plan view of a polymer electrolyte layer, including distance defining members, of a polymer battery of a third embodiment according to the present invention.
Figure 6B:
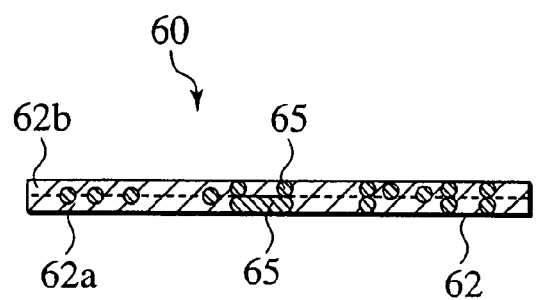
FIG. 6B is a cross sectional view, taken on line VI-VI of FIG. 6A, of the polymer electrolyte layer including the distance defining members.

Next, a polymer battery of a third embodiment according to the present invention and its related method are described in detail mainly with reference to FIGS. 6A and 6B. The polymer battery, i.e., a bipolar battery, of this embodiment, differ in structure from that of the first embodiment in respect of distance defining members of a polymer electrolyte layer and is similar in other respects. Therefore, this embodiment is described aiming at such differential aspects and like component parts bear the same reference numerals to suitably simplify description or to omit description.

FIG. 6A is a plan view of the polymer electrolyte layer including the distance defining members for the bipolar battery of the third embodiment according to the present invention, and FIG. 6B is a cross section, taken along line VI-VI of FIG. 6A, of the polymer electrolyte layer including such distance defining members.

As shown in FIGS. 6A and 6B, in the presently filed embodiment, the polymer electrolyte layer 60 is comprised of a polymer electrolyte 62 in which the distance defining members 65 are embedded. The distance defining members 65 are formed in a porous sheet with a single piece of or a plurality of wire-like members getting entangled in a nonwoven state. Incidentally, for the sake of convenience, the widths of the distance defining members 65 are omitted in FIG. 6A.

Materials to be used for the distance defining members 65 are similar to those of the first embodiment and may include resin fibers or metallic thin wires with their surfaces coated with resin. The use of such resin fibers or metallic thin wires with their surfaces coated with resin which are arranged not to get woven but to get entangled in the nonwoven state allows the porous sheet for the distance defining member 65 to be formed.

The polymer electrolyte layer 60, in which the distance defining members 65 are buried, is fabricated in a process described below.

First, as conceptually shown in FIG. 6B, a spunbond nonwoven fabric 65 (nonwoven fabric formed by thermally welding fibers to one another without binder: a porous sheet) composed of PP fibers each with a wire diameter of 20 μm is placed onto a PET film 62a and, then, a mixture of polymer (co-polymer of PEO and PPO), supporting salt ($LiN(SO_2C_2F_5)_2$) and ultraviolet polymerization initiator (benzyldimethyl-ketal) is coated over the resulting PET film. And, further superposed on the PET film 62a thus coated is another PET film 62b, with polymerization being achieved through ultraviolet radiation to form the polymer electrolyte layer 60. In such a way, the polymer electrolyte layer 60 can be formed in a structure with the specified portions thereof being formed of the distance defining members 65 but the other major portion thereof being formed of the polymer electrolyte 62 to enable favorable ion transfer. Also, while in FIG. 6B, the PET films 62a, 62b are conceptually shown, in actual practice, a boundary between the PET films 62a, 62b substantially disappears upon formation of the polymer electrolyte layer 60 like in the first embodiment.

Fourth Embodiment

Figure 7A:
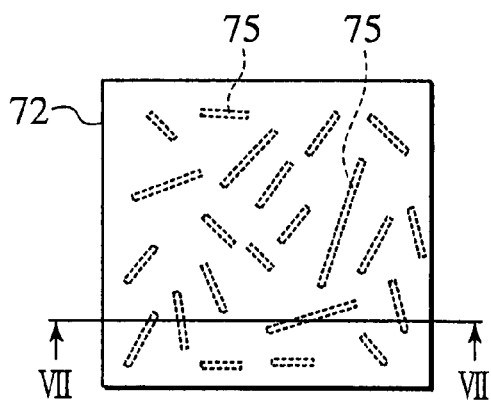
FIG. 7A is a plan view of a polymer electrolyte layer, including distance defining members, of a polymer battery of a fourth embodiment according to the present invention.
Figure 7B:
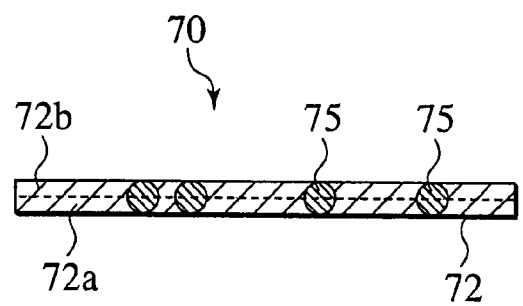
FIG. 7B is a cross sectional view, taken on line VII-VII of FIG. 7A, of the polymer electrolyte layer including the distance defining members.

Next, a polymer battery of a fourth embodiment according to the present invention and its related method are described in detail mainly with reference to FIGS. 7A and 7B. The polymer battery, i.e., a bipolar battery, of this embodiment, differ in structure from that of the first embodiment in respect of distance defining members of a polymer electrolyte layer and is similar in other respects. Therefore, this embodiment is described aiming at such differential aspects and like component parts bear the same reference numerals to suitably simplify description or to omit description.

FIG. 7A is a plan view of the polymer electrolyte layer including the distance defining members for the bipolar battery of the fourth embodiment according to the present invention, and FIG. 7B is a cross section, taken along line VII-VII of FIG. 7A, of the polymer electrolyte layer including such distance defining members.

As shown in FIGS. 7A and 7B, in the presently filed embodiment, the polymer electrolyte layer 70 is comprised of a polymer electrolyte 72 in which the distance defining members 75 are embedded. The distance defining members 75 are comprised of a plurality of small sized wire-like fragments that are randomly dispersed.

Materials to be used for the small fragments of the distance defining members 75 may include ceramics. And, ceramic material may include alumina ($Al_2O_3$), $SiO_2$ and $ZrO_2$. Of course, no limitation is intended for these materials and, if circumstances demand, the same materials as those of the first embodiment may be employed.

The polymer electrolyte layer 70, in which the distance defining members 75 are buried, is fabricated in a process described below.

First, as conceptually shown in FIG. 7B, a mixture of polymer (co-polymer of PEO and PPO), supporting salt (LiN($SO_2C_2F_5)_2$) and ultraviolet polymerization initiator (benzyldimethyl-ketal) is coated on a PET film 72a and, then, needle-shaped alumina fragments 75 are randomly disposed. And, further superposed on the PET film 72a, on which the alumina fragments are disposed, is another PET film 72b, with polymerization being achieved through ultraviolet radiation to form the polymer electrolyte layer 70. In such a way, the polymer electrolyte layer 70 can be formed in a structure with the specified portions thereof being formed of the distance defining members 75 but the other major portion thereof being formed of the polymer electrolyte 72 to enable favorable ion transfer. Also, while in FIG. 7B, the PET films 72a, 72b are conceptually shown, in actual practice, a boundary between the PET films 72a, 72b substantially disappears upon formation of the polymer electrolyte layer 70 like in the first embodiment.

Fifth Embodiment

Figure 8A:
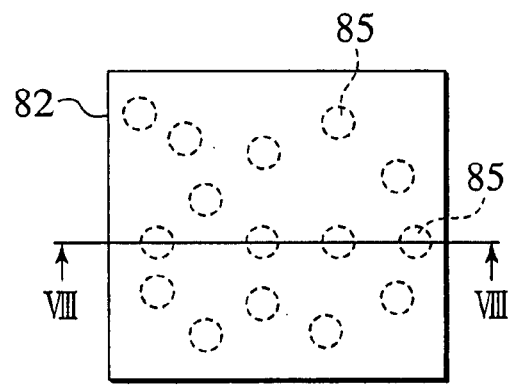
FIG. 8A is a plan view of a polymer electrolyte layer, including distance defining members, of a polymer battery of a fifth embodiment according to the present invention.
Figure 8B:
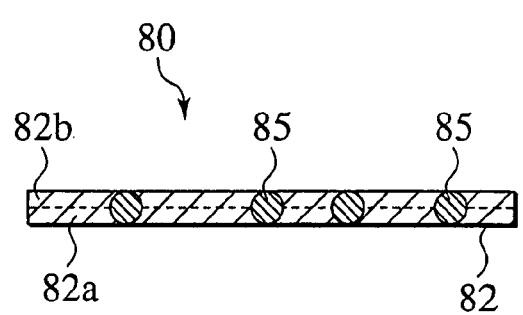
FIG. 8B is a cross sectional view, taken on line VIII-VIII of FIG. 8A, of the polymer electrolyte layer including the distance defining members.

Next, a polymer battery of a fifth embodiment according to the present invention and its related method are described in detail mainly with reference to FIGS. 8A and 8B. The polymer battery, i.e., a bipolar battery, of this embodiment, differ in structure from that of the first embodiment in respect of distance defining members of a polymer electrolyte layer and is similar in other respects. Therefore, this embodiment is described aiming at such differential aspects and like component parts bear the same reference numerals to suitably simplify description or to omit description.

FIG. 8A is a plan view of the polymer electrolyte layer including the distance defining members for the bipolar battery of the fifth embodiment according to the present invention, and FIG. 8B is a cross section, taken along line VIII-VIII of FIG. 8A, of the polymer electrolyte layer including such distance defining members.

As shown in FIGS. 8A and 8B, in the presently filed embodiment, the polymer electrolyte layer 80 is comprised of a polymer electrolyte 82 in which the distance defining members 85 are embedded. The distance defining members 85 are comprised of a plurality of small spherical balls which are randomly disposed in structure.

Materials to be used for the small spherical balls 85 may include resin, metallic balls with surfaces coated with resin and, in addition to these materials, may include small ceramic balls like in the fourth embodiment. And, resin fibers include PP, PE, PET, polyamide synthetic fiber, polyimide and silicone, and as ceramic materials, alumina ($Al_2O_3$), $SiO_2$ and $ZrO_2$ may be used. Of course, no limitation is intended to these materials.

The polymer electrolyte layer 80, in which the distance defining members 85 are buried, is fabricated in a process described below.

First, as conceptually shown in FIG. 8B, a mixture of polymer (co-polymer of PEO and PPO), supporting salt (LiN($SO_2C_2F_5)_2$) and ultraviolet polymerization initiator (benzyldimethyl-ketal) is coated on a PET film 82a and, then, polymer beads 85 with diameter of 20 μm are randomly disposed. And, further superposed on the PET film 82a, on which the polymer beads are disposed, is another PET film 82b, with polymerization being achieved through ultraviolet radiation to form the polymer electrolyte layer 80. In such a way, the polymer electrolyte layer 80 can be formed in a structure with the specified portions thereof being formed of the distance defining members 85 but the other major portion thereof being formed of the polymer electrolyte 82 to enable favorable ion transfer. Also, while in FIG. 8B, the PET films 82a, 82b are conceptually shown, in actual practice, a boundary between the PET films 82a, 82b substantially disappears upon formation of the polymer electrolyte layer 80 like in the first embodiment.

Also, it is of course to be appreciated that the distance defining members 45, 55, 65, 75, 85 of the respective embodiments set forth above can be used in suitable combination.

Further, as previously described above, the polymer electrolyte layers 4, 50, 60, 70, 80 are formed to include the distance defining members 45, 55, 65, 75, 85 of the various variations, respectively. Accordingly, application of such polymer electrolyte layers to the bipolar battery provides the following advantageous benefits.

(1) Due to an additional increase in a mechanical strength of the polymer electrolyte layer as a result of the distance defining members, the polymer electrolyte layer can be formed in a further thin film configuration with resultant improvement over ion conductivity of the polymer electrolyte layer, and the bipolar battery 30 with a further increased efficiency can be obtained. Also, from the viewpoint of improvement in the ion conductivity, the thickness of the polymer electrolyte layer may preferably lie in a range equal to or less than 50 μm.

(2) Because of the distance defining members disposed in adequately spaced locations, favorable ion transfer can be achieved with no interference of ion transfer and sufficient battery reaction can be obtained.

(3) Since the distance defining members, at least surfaces of which are composed of insulation materials, function as spacers to separate the positive electrode active material layer 2 and the negative electrode active material layer 3, the positive electrode active material layer 2 and the negative electrode active material layer 3 can be avoided from being brought into contact with one another in a short-circuited condition.

(4) Due to provision of the distance defining members disposed in the polymer solid electrolyte layer that has a high mechanical strength, the distance defining members do not need to have a higher mechanical strength than that of the separator necessarily provided in a liquid electrolyte layer. As a result, even if an occupied density of the distance defining members is lowered to increase the ion conductivity, the polymer solid electrolyte layer as a whole is able to obtain a mechanical strength adequate for precluding short-circuiting.

With a view to confirming results of the structures (1) and (2) mentioned above, experimental tests were conducted in ways discussed below by measuring resistances of the polymer solid electrolyte layer with no introduction of the distance defining members and the polymer solid electrolyte layer in which the distance defining members were introduced, respectively.

More particularly, the polymer solid electrolyte layer with no introduction of the distance defining members was prepared that had a thickness of 100 μm as a result of inability to achieve thin film formation because of a required mechanical strength. In the meantime, the polymer solid electrolyte layers each with the distance defining members being introduced and each with a thickness of 20 μm ware prepared for all structures of the first to fifth embodiments, respectively.

And, respective polymer electrolyte layers were cut out into samples, each with a size of 1 cm$^2$, respectively, and resistance values of these samples were measured by an alternating impedance method at 25° C.

As a result, the polymer solid electrolyte layer with no introduction of the distance defining members exhibited the resistance of 642Ω.

In contrast, the polymer solid electrolyte layers with the distance defining members of the respective embodiments being introduced had the following resistances.

The polymer solid electrolyte layer introducing the distance defining members formed of the plural wire-like resins disposed in substantially parallel to one another with the given distances in accordance with the first embodiment had the resistance of 135Ω. The polymer solid electrolyte layer introducing the distance defining members formed of the metallic wires, each having the surface coated with resin, disposed in the lattice form in accordance with the second embodiment had the resistance of 161Ω. The polymer solid electrolyte layer introducing the distance defining members formed of the single piece of or the plural of wire-like members entangled in the nonwoven form in accordance with the third embodiment had the resistance of 156Ω. The polymer solid electrolyte layer introducing the distance defining members formed of the plural wire-like small fragments randomly disposed in accordance with the fourth embodiment had the resistance of 130Ω. The polymer solid electrolyte layer introducing the distance defining members formed of the plural small balls randomly disposed in accordance with the fifth embodiment had the resistance of 129Ω.

From the foregoing results, it is understood from comparison between the structure with no introduction of the distance defining members and the structure with introduction of the distance defining members that the resistance values of the structures introducing the distance defining members of any embodiment decrease with a resultant increase in the ion conductivity. This has proved that the presence of decrease in the resistance value of the electrolyte layer with the thickness formed in the thin film configuration exhibits greater merit than that caused by increase in the resistance value resulting from the distance defining members being introduced, and it is concluded that the polymer electrolyte layer has more excellent benefits both in ion conductivity and mechanical strength.

Subsequently, experimental tests were conducted to find whether it is possible to obtain the result of the structure (3) set forth above providing essential effects of the distance defining members by fabricating a bipolar battery to which the polymer electrolyte layer with the distance defining members being introduced and the polymer electrolyte layer with no introduction of the distance defining members were applied.

Here, five pieces of the bipolar batteries were prepared each of which had the polymer electrolyte layers each with a thickness of 20 μm regardless of whether the distance defining members are introduced or not introduced and each of which included ten stacks of unit cell layers. And, after completion, the bipolar batteries were charged and output voltages of respective unit cell layers were measured.

As a result, it was observed in the bipolar batteries with no introduction of the distance defining members that voltage drops caused by internal short-circuiting in a total of six unit cell layers among the polymer electrolyte layers of the five pieces of bipolar batteries. On the contrary, no voltage drop due to internal short-circuiting was observed in the bipolar batteries in which the distance defining members were introduced.

From the foregoing, it is cleared that the presence of the distance defining members included in the polymer electrolyte layer enables the mechanical strength of the polymer electrolyte layer formed in the thin film configuration to increase and short-circuiting due to damages can be avoided.

Further, experimental tests were conducted to find whether it is possible to obtain the result of the structure (4) set forth above by fabricating a bipolar battery having a liquid electrolyte layer and a bipolar battery having a polymer electrolyte layer.

When in introduction of a nonwoven fabric as a separator for a liquid electrolyte layer, unless the nonwoven fabric had an area density (nominal weight) in a range of 30 to 80 g/m$^2$, no adequate function of the separator was found and the positive electrode electrolyte layer and the negative electrode electrolyte layer were brought into contact through gaps of the nonwoven fabric, resulting in short-circuiting. In contrast, in a case where the nonwoven fabric was included as the distance defining member in the polymer electrolyte layer as in the third embodiment, even if the area density of the nonwoven fabric was lowered to an extent in a range of approximately 10 g/m$^2$, no short-circuiting occurred. This results from a reason that the polymer electrolyte per se in a solid or semi-solid form has a mechanical strength and, even if the area density of the nonwoven fabric is low, no compression takes place in the nonwoven fabric and no contact occurs through the gaps of the nonwoven fabric between the positive electrode electrolyte layer and the negative electrode electrolyte layer.

From this result, it is understood that with the polymer electrolyte layer of the present invention, even if the area density of the nonwoven fabric is lowered, that is, even if the occupied density of the distance defining members is lowered, for the purpose of further increasing the ion conductivity, it is possible to obtain a mechanical strength adequate for avoiding short-circuiting of the polymer electrolyte layer as a whole.

Further, like the area density, in the second and third embodiments, even if a size of an eye of the lattice forming the distance defining member and a size of a gap of the mesh of the nonwoven fabric, that is, a size of an opening portion of the porous sheet is large, it becomes possible to avoid short-circuiting owing to the strength of the polymer electrolyte layer per se. Experimentally, it is understood that no short-circuiting occurs even if the polymer electrolyte includes opening portions, shown in FIGS. 5A and 6A, in size of an area S equal to or greater than 1 mm$^2$. Since the opening portion with the area S in a range equal to or greater than 1 mm$^2$ is allowable, this results in a capability of increasing the ion conductivity.

In the foregoing, although the various embodiments of the present invention have been described, the present invention is not limited to such embodiments. While description has been illustratively made of the bipolar batteries, the present invention is not limited to such illustrations and the principle of the present invention can be applied to polymer batteries other than the bipolar batteries.

Sixth Embodiment

This embodiment is related to a battery (battery module) composed of a plurality of pieces of the bipolar batteries of the respective embodiments set forth above.

Figure 9:
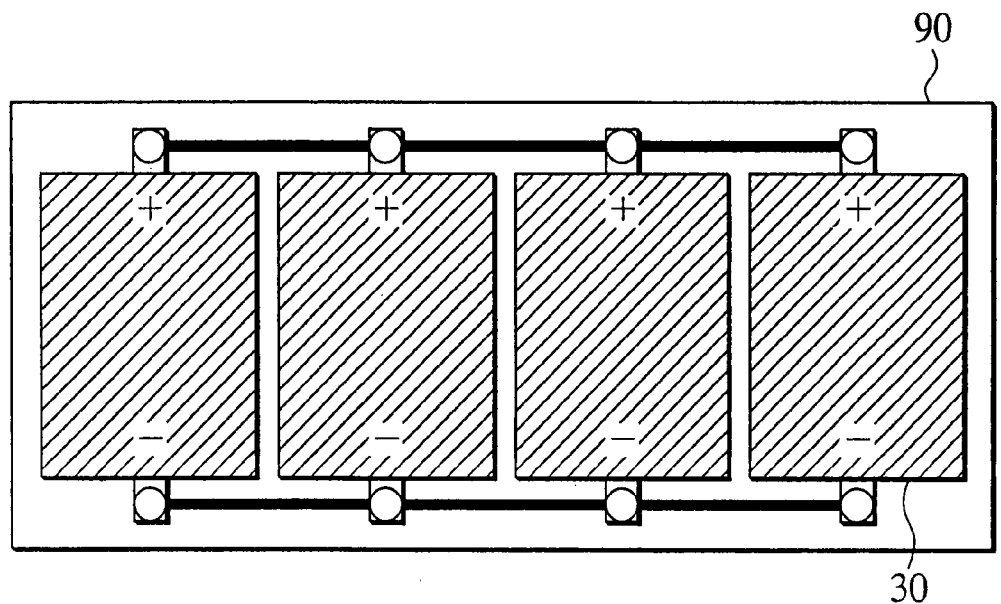
FIG. 9 is a schematic view of a battery of a sixth embodiment according to the present invention to which the polymer batteries of the first to fifth embodiments can be applied.

FIG. 9 is a schematic view illustrating the battery of the presently filed embodiment to which the polymer batteries of the first to fifth embodiments of the present invention can be applied.

As shown in FIG. 9, preparing a plurality of pieces of bipolar batteries 30 described above with reference to the first to the fifth embodiments, respectively, and connecting the positive terminals to one another and connecting the negative terminals to one another in parallel connection enable a battery 90 with a long durability to be obtained.

Thus, with the battery 90 of the presently filed embodiment, the bipolar batteries 30 mutually connected in parallel in a simplified structure enables formation of the battery.

Further, since the battery 90 is formed of a plurality of bipolar batteries 30, even if there is one defective in the bipolar batteries 30, mere replacement of one defective allows remaining other non-defectives to be left as they are, resulting in an excellent economy.

Also, while the figure has shown only a case wherein the bipolar batteries 30 are connected in parallel, the negative terminal of the bipolar battery can be consecutively connected to the positive terminal of the other bipolar battery 30 such that the bipolar batteries 30 are connected in series to be formed in the battery. Series connection enables the battery with a high power output to be obtained. Of course, it is not objectionable to suitably combine series and parallel connections.

Seventh Embodiment

This embodiment is related to a vehicle in which the bipolar batteries of the first to fifth embodiments or the battery of the sixth embodiment are installed a drive power source.

Figure 10:
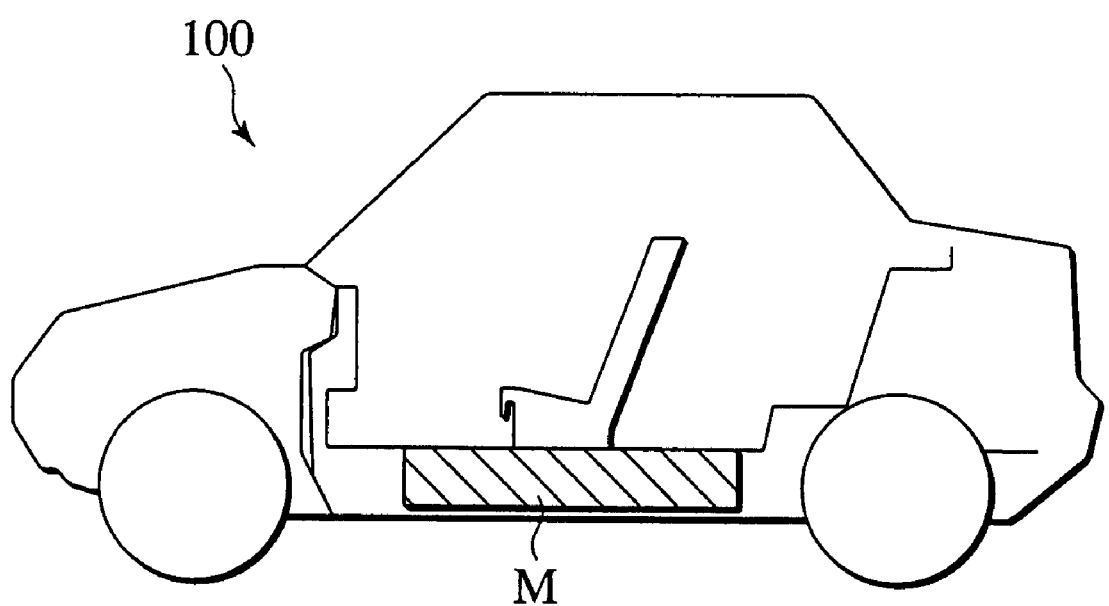
FIG. 10 is a schematic view illustrating a vehicle of a seventh embodiment according to the present invention installed with the polymer batteries of the first to fifth embodiments or the battery of the sixth embodiment to which such polymer batteries can be applied.

FIG. 10 is a schematic view illustrating the vehicle of the presently filed embodiment in which the bipolar batteries of the first to fifth embodiments or the battery, to which such bipolar batteries are applied, are installed.

The bipolar batteries 30 of the respective embodiments and the battery 90 have a variety of characteristics and, especially, they are compact batteries. For this reason, these batteries are preferable as a vehicle power supply in which severe demands are made in an energy density and a power density. Also, while if the polymer solid electrolyte is used for electrolyte 4, electrolyte 4 has a tendency in which the ion conductivity is lower than that of gel electrolyte, when using the battery in the vehicle 100, it is possible for a circumferential environment of the bipolar battery to be kept under a high temperature to some extent. From this viewpoint, it can be said that the bipolar batteries 30 of the respective embodiments and the battery 90 can be preferable to be used in the vehicle 100.

As set forth above, according to the polymer battery of the present invention, due to the distance defining members included in the polymer electrolyte layer, since the distance defining members provide a high mechanical strength, even if the polymer electrolyte layer is made to be small in thickness, an overall strength is strongly enhanced and the presence of the distance defining members interposed between the positive electrode active material layer and the negative electrode active material layer enables these components parts to be prevented from being brought into contact with one another for thereby preventing short-circuiting.

The entire content of a Patent Application, No. TOKUGAN 2002-316039 with a filing date of Oct. 30, 2002 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A polymer battery comprising:
a positive electrode active material layer;
a negative electrode active material layer placed in opposition to the positive electrode active material layer;
a polymer electrolyte layer disposed between the positive electrode active material layer and the negative electrode active material layer; and
a distance defining member included in the polymer electrolyte layer to define a distance between the positive electrode active material layer and the negative electrode active material layer,
wherein the polymer electrolyte layer is made of any of solid electrolyte and semi-solid electrolyte, the distance defining member is a plurality of wire members which are configured to a mesh structure formed with opening portions, and a ratio of each area of the opening portions of the mesh structure with respect to a thickness of the polymer electrolyte layer is set to be equal or greater than 20, and
wherein the distance defining member includes a metallic material whose surface is coated with resin.

2. The polymer battery according to claim 1, wherein the distance defining member is a metallic wire whose surface is coated with the resin.

3. A polymer battery comprising:
a positive electrode active material layer;
a negative electrode active material layer placed in opposition to the positive electrode active material layer;
a polymer electrolyte layer disposed between the positive electrode active material layer and the negative electrode active material layer; and
a distance defining member included in the polymer electrolyte layer to define a distance between the positive electrode active material layer and the negative electrode active material layer,
wherein the polymer electrolyte layer is made of any of solid electrolyte and semi-solid electrolyte, the distance defining member is a porous sheet formed with opening portions, and a ratio of each area of the opening portions of the porous sheet with respect to a thickness of the polymer electrolyte layer is set to be equal to or greater than 20,
and wherein the distance defining member includes a metallic material whose surface is coated with resin.

4. The polymer battery according to claim 1, wherein the thickness of the polymer electrolyte layer is set to have a range from 20 μm to 50 μm, and each area of the opening portions of the mesh structure is equal to or greater than 1 mm$^2$.

5. The polymer battery according to claim 3, wherein the thickness of the polymer electrolyte layer is set to have a range from 20 μm to 50 μm, and each area of the opening portions of the porous sheet is equal to or greater than 1 mm$^2$.

6. A polymer battery comprising:
a positive electrode active material layer;
a negative electrode active material layer placed in opposition to the positive electrode active material layer;
a polymer electrolyte layer disposed between the positive electrode active material layer and the negative electrode active material layer; and
a distance defining member included in the polymer electrolyte layer to define a distance between the positive electrode active material layer and the negative electrode active material layer,
wherein the polymer electrolyte layer is made of any of solid electrolyte and semi-solid electrolyte to cover the distance defining member, and
wherein the distance defining member includes a metallic material whose surface is coated with resin.

* * * * *